United States Patent [19]

Neary et al.

[11] Patent Number: 4,696,257

[45] Date of Patent: Sep. 29, 1987

[54] SELF DRYING PET LITTER BOX

[75] Inventors: John F. Neary, 7540 34th St., St. Petersburg, Fla. 33711; John T. Peddy, Clearwater; David H. Willis, Largo, both of Fla.

[73] Assignee: John F. Neary, St. Petersburg, Fla.

[21] Appl. No.: 896,680

[22] Filed: Aug. 20, 1986

Related U.S. Application Data

[63] Continuation-in-part of Ser. No. 771,519, Aug. 30, 1985, Pat. No. 4,649,862.

[51] Int. Cl.⁴ ............................................. A01K 29/00
[52] U.S. Cl. ............................................. 119/1; 119/19
[58] Field of Search ........................................ 119/1, 19

[56] References Cited

U.S. PATENT DOCUMENTS

| | | |
|---|---|---|
| 1,636,372 | 7/1927 | Kohn . |
| 2,859,321 | 11/1958 | Garaway . |
| 2,971,493 | 2/1961 | Robb . |
| 3,108,170 | 10/1963 | Murphy . |
| 3,455,277 | 7/1969 | Edwards . |
| 3,566,838 | 3/1971 | Edwards . |
| 3,679,473 | 7/1972 | Blatchford et al. . |
| 4,095,559 | 6/1978 | Griffith ............................ 119/1 |
| 4,161,157 | 7/1979 | Haugen . |
| 4,313,234 | 2/1982 | Stewart . |
| 4,546,727 | 10/1985 | Anderson . |
| 4,587,402 | 5/1986 | Nishino et al. . |

FOREIGN PATENT DOCUMENTS 1158490 12/1983 Canada ............................ 119/19

OTHER PUBLICATIONS

Advertisement for "Kitty Privy", Cattus Limited.

Primary Examiner—William F. Pate, III
Assistant Examiner—Richard E. Chilcot, Jr.
Attorney, Agent, or Firm—Pettis & McDonald

[57] ABSTRACT

A self drying pet litter box includes a foraminous panel supported above the bottom of a box like container to facilitate circulation of air through particulate litter material supported on the panel.

20 Claims, 4 Drawing Figures

SELF DRYING PET LITTER BOX

RELATED APPLICATION

This application is a continuation-in-part of patent application Ser. No. 06/771,519, now U.S. Pat. No. 4,649,862 entitled Sanitizing Apparatus for Pet Litter Box file Aug. 30, 1985, in the name of John F. Neary.

FIELD OF THE INVENTION

This invention relates generally to the field of disposal apparatus for pet body waste. More particularly, it relates to litter boxes used for collecting pet waste. Still more particularly it relates to apparatus for drying the litter contained within such litter boxes.

BACKGROUND OF THE INVENTION

Pet litter boxes have long been used for collecting waste from household pets, such as cats and other domesticated animals that are kept indoors. Such litter boxes generally comprise a container holding a quantity of sand or adsorbent particles of a dried clay, such as fuller's earth. Such adsorbent materials adsorb and hold the urine deposited by the pet and serve to desiccate and partially adsorb odor from feces deposited by the using pet.

The conventional litter box has suffered from several disadvantages. First, the particulate litter material used therein has a limited capacity for liquid adsorption. Accordingly, it is necessary to empty the soiled litter material and replace it with fresh litter at regular intervals. Additionally, the feces and urine may contain or develop various bacteria and viruses that may infect the pet or be distributed throughout the house by the pet using the litter.

Various approaches have been tried to improve the necessary indoor waste disposal. These have included placing a partially enclosed cover over the litter box to control odor and using various deodorizing apparatus within such an enclosed box to reduce odors. In one case it has been proposed to dispense entirely with the litter with the pet depositing its waste upon a solid tray, such as metal, which is then dumped into a container below the tray for drying and evaporation. However, none of these approaches has provided the benefit of the use of particulate litter while providing for extended use of that litter under more sanitary conditions.

SUMMARY OF THE INVENTION

It is an object of the present invention to provide a self-drying pet litter box. It is an additional object of this invention to provide such apparatus that reduces the growth of bacteria that are present in the litter material that has been used by a pet. It is a further object of this invention to provide such apparatus that dries the litter material to slow the growth of bacteria and viruses residing upon the particulate litter material and the odor resulting therefrom.

According to this invention there is provided a self-drying pet litter box includes a box-like container having upwardly extending sides, a foraminous panel received within the container and structure for supporting the panel generally horizontally and spaced above the lowermost portion of the container so that the upwardly facing surface of the panel will support particulate litter material placed thereupon. A preferred embodiment of the invention may also include a heating element for applying heat to the panel and apparatus for selectively controlling the application of heat to the panel so that the temperatures of the panel and of the litter material supported thereupon are raised to predetermined levels and maintained at those levels for a time sufficient to destroy bacteria residing upon the panel and upon particulate litter material, with such apparatus thereafter discontinuing the application of heat.

BRIEF DESCRIPTION OF THE DRAWINGS

A particularly preferred embodiment of the self-drying pet litter box of this invention will be described in detail below in co with the drawings in which.

DETAILED DESCRIPTION OF A PREFERRED EMBODIMENT

Figure 1:
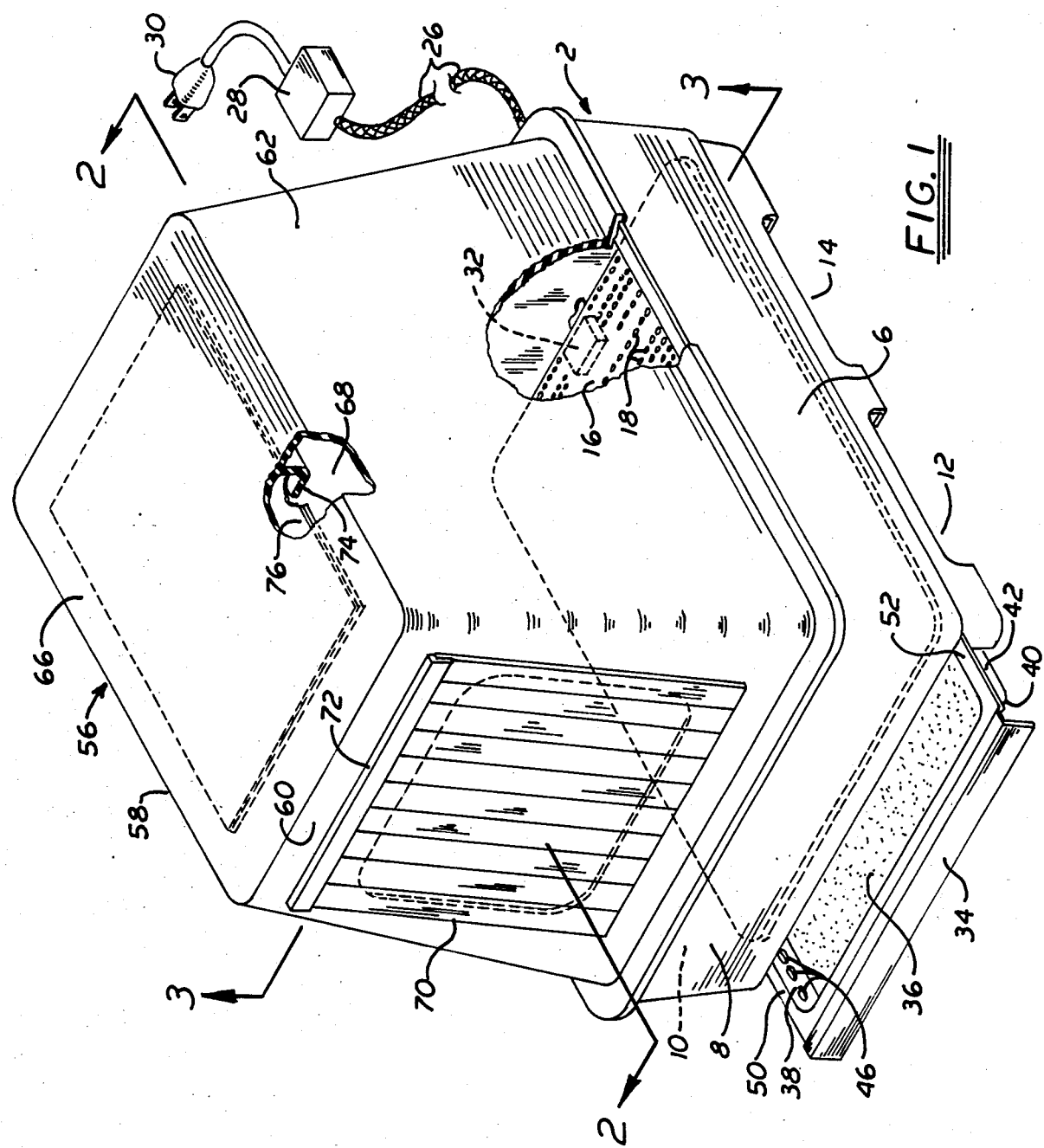
FIG. 1 is perspective view of the apparatus of this invention, partially in section to illustrate some of the components within.
Figure 3:
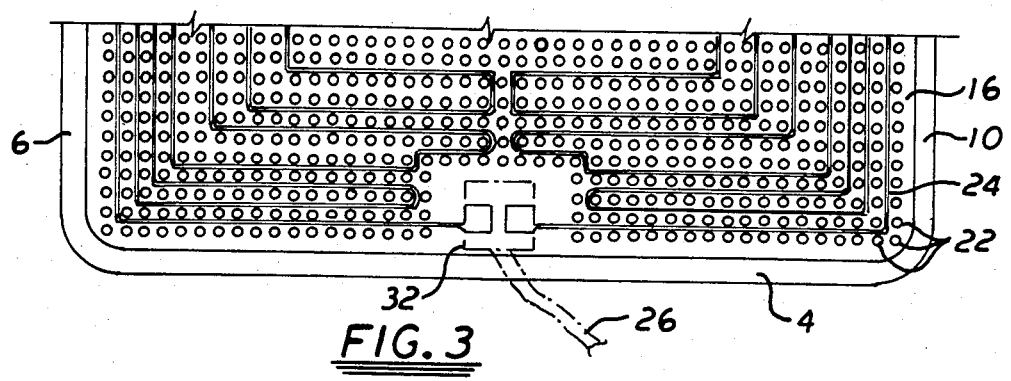
FIG. 3 is a fragmentary sectional view of the apparatus of FIG. 1, taken along line 3—3 from below the supporting panel.
Figure 2:
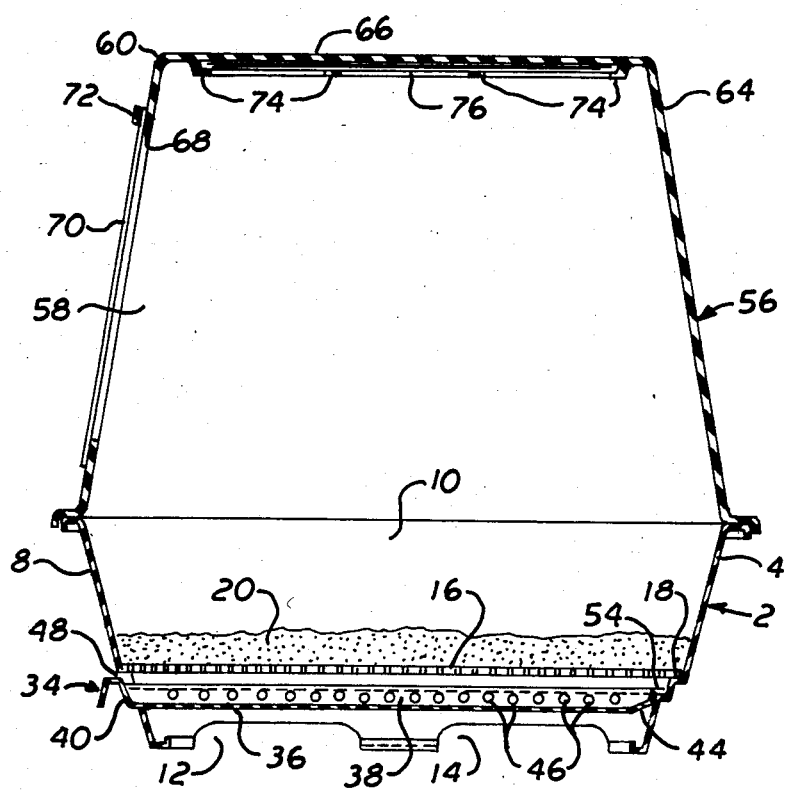
FIG. 2 is a side sectional view of the apparatus of FIG. 1, taken along 2—2.

A particularly preferred embodiment of the self-drying pet litter box of this invention is illustrated in FIGS. 1 through 3. While this litter box could be round or of any other suitable shape, in this preferred embodiment it comprises a box-like container 2 having four lateral sides 4, 6, 8 and 10 and is formed of any suitably rigid material, such as a thermpolastic resin. In at least one, and preferably more, of the sides there is provided at least one aperture through a lower portion thereof, whereby air may pass through the aperture from points exterior to the container to the interior of the container. In the embodiment of FIG. 1 such apertures are formed by the cutouts shown in the lateral side 6, which cutouts are defined by the edges indicated by reference numerals 12 and 14.

Figure 4:
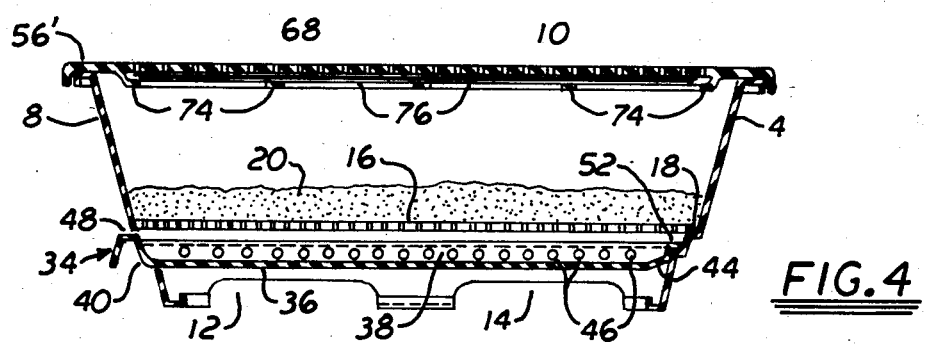
FIG. 4 is an end sectional view, similar to that of FIG. 2 but incorporating a different top portion.

Within the box-like container 2 is supported and received a foraminous panel 16. This panel, described in greater detail below has at least one substantially flat surface and is supported within the container 2 by suitable means, such as the inside surface of the lip 18 extending around the container, as shown in FIGS. 3 and 4. This lip engages the edge portions of the panel to support the panel 16 in a generally horizontal position spaced above the lowermost portion of the container sides so that the substantially flat upward facing surface of that panel 16 supports a particulate litter material 20 placed thereupon. This litter material conventionally comprises dried clay particles well known in the art. The engagement between the container lip 18 and the edges of the panel 16 serves to substantially exclude passage of the litter material between the panel edge portions and the container.

The panel 16 is illustrated in greater detail in the fragmentary view, taken from below, of FIG. 3. The panel 16 may be formed of any suitable rigid material, such as a rigid synthetic resin or a metal plate. In this preferred embodiment the panel 16 is formed of a thin steel plate having a porcelainized finish on its surfaces. Panel 16 is provided with a large plurality of apertures 22 extending therethrough and distributed across substantially the entire panel. These apertures have a diameter sufficient to encourage air flow therethrough but small enough to resist substantial passage of the litter particles, in order to maintain support of the litter particles above the panel. These apertures may suitably have a diameter of about 3/32 inch and may suitably be formed on approximately one-quarter inch centers across most of the panel.

Adjacent the panel 16 in this preferred embodiment is also provided suitable means for applying heat to the panel to heat both the particulate litter material supported by the panel and also the liquid and solid waste material deposited by an animal on that litter material. Although various arrangement of heating elements may suitably be used, in this preferred embodiment the heating element 24 is in the form of a thick film conductor, such as DuPont 8032 material or other appropriate resistive alloy, applied directly to the porcelainized metal panel. This heating element 24 preferably, but not necessarily, is applied to the underside of the panel 16 both to protect the element from possible damage by the animal using the litter box and also to promote more even heating of the panel itself. The heating element 24 is applied in any suitable pattern that will effect a relatively uniform heating of substantially the entire panel 16. Preferably, the heating element 24 extends adjacent and substantially along each of the sides of the panel 16 and between opposing such sides so that the operation of the heating element serve to apply heat to substantially the entire litter material supporting portion of that panel. The heating element and panel are also provided with a suitable plug and socket arrangement connected to the ends of the heating element 24 to provide for electrical energization from an appropriate cord 26. This cord 26 extends from the heating element 24 to appropriate controlling means 28, which likewise is connected to a source of electricity, preferably through a wall plug 30. The controlling means 28 includes an appropriate thermostat adjacent the panel 16 and appropriate circuitry to control the application of heat to the panel 16 such that the temperature of the panel 16 and of the litter material supported thereupon are raised to predetermined levels and maintained at those levels for a time sufficient to destroy bacteria residing upon the panel and upon the particulate litter material and carried by the liquid and solid waste deposited thereupon. This controlling means 28 also provides for subsequent discontinuing of the application of heat after the heat has been so applied for the predetermined times at the predetermined temperatures. It has been found convenient to incorporate into a single unit 32 both the connector connecting the cord 26 to the heating element 24 and the thermostatic device for measuring the temperature of the panel 16 and thereby controlling the apparatus 28 as described above.

To destroy the bacteria in the desired manner, it has been found that the particulate litter material 20 should be maintained at a temperature of at least about 145 degree F. for at least one-half hour. It has been found that this generally requires a panel temperature of about 180 degrees F. Obviously, shorter times could be utilized if the temperature of the particulate litter material were increased, and slightly lower temperatures might be utilized if the treatment time were substantially increased. Both the temperatur and the time of heating may be controlled by the device 28, which may include both thermostatic and timer apparatus, whereby the application of heat will be discontinued after the predetermined period.

Beneath the panel 16 in this preferred embodiment there is conveniently provided slideably received tray means 34 removably receivable within the container 2. This tray is configured and dimensioned to cover substantially the entire projected area of the container immediately beneath the panel 16. Thus, this tray means 34 will receive within it any fines of the particulate litter material that may sift through the panel 16, and it will also receive any urine not adsorbed by the particulate litter material 20. This tray 34 is formed with a base 36 and four sides 38, 40, 42, and 44 extending upwardly therefrom. At least one of the tray sides also includes at least one and preferably a plurality of apertures 46 to permit the passage of air therethrough. Thus, air may flow by convection through the apertures 12 and 14 in the container sides, through the apertures 46 in the tray material and upwardly through the apertures 22 in the panel 16, thus assisting in the drying and heating of the particulate litter material 20. This tray 34 may suitably be received through an aperture 48 through one side 8 of the container 2. The sides 38 and 42 of the tray 34 suitably may include outwardly extending flanges 50 and 52 that slidably engage portions of a lower lip 54 of the sides of the container 2.

As shown in FIGS. 1 and 2, the preferred embodiment of the litter box of this invention may also be provided with removable cover means 56 extending across the top of the lateral side 4, 6, 8 and 10. In embodiment of FIGS. 1 and 2, this cover 56 includes side portions 58, 60, 62 and 64 extending upwardly from engagement with the uppermost edges of the container lateral sides 4, 6, 8 and 10 and a top panel 66 extending between those side portions. Obviously, the side portions could be extended continuously upwardly to eliminate the need for the top panel 66. In one of the side portions, such as side 60 of the preferred embodiment, there is provided an aperture, shown in phantom shown in FIG. 1 and indicated by reference numeral 68. This aperture is dimensioned and positioned to permit passage of an animal therethrough to enter and exit the litter box. This aperture 68 preferably is covered, at least partially, by a curtain means 70, which may be formed of a flexible odor adsorbing material that permits passage of water vapor and air. This material may be permanent, such as fabric or felt, or may be made of a replaceable material such as newspaper or paper toweling, held in place by a suitable retainer 72. Preferably this curtain means 70 may be in the form of a plurality of strips extending across the aperture 68, such that the animal may push aside those strips to enter or exit the litter box. By using this flexible, odor adsorbing material, at least a portion of any odor molecules driven off by the heating of the litter material within the box may be adsorbed by the curtain means to reduce the escape of odors.

To further assist in control of the odor it has been found that an additional layer of adsorbing material, such as newspaper be advantageously be retained in the top of the cover means 56. As shown in FIGS. 1 and 2, appropriate and conventional supporting arrangements, such as a grid or the like, may be affixed to or molded integrally with the underside of the top panel 66. This support 74 may then receive a section of adsorbing material 76, such as newspaper of the like. It has been found that the odor molecules driven off by the heating of the litter will tend to be adsorbed in this material 76, while water vapor and air pass through the material 76, which may be removed and discarded periodically.

In FIG. 4 is illustrated an alternative embodiment of the cover means 56, comprising a generally flat panel member extending transversely of the container lateral sides 4, 6, 8 and 10 and proximal the uppermost edges thereof. This flat panel cover 56' includes at least one and preferably a plurality of apertures 68' extending therethrough to permit the convective passage of the heated air therethrough. This cover 56' may desirably be provided with clip or retaining means 74' to hold material 76' over the top of that panel, in a manner analogous to the elements 74 and 76 in the embodiment of FIGS. 1 and 2. This material 76' may likewise be a felt material or newspaper or paper toweling and is provided for the same purpose of adsorbing at least a portion of the moisture driven off by heating of the litter material to reduce the escape of odors. It has been found that the use of such material permits a substantial convective flow through the apertures 68' of air and moisture driven off by the heating of the litter. By positioning the adsorptive material 76' in a position covering the apertures 68', the material tends to reduce slightly that convective flow while retaining more heat within the litter box. This reduction in the convective flow of air has the advantage of increasing the temperature of the litter over the temperature that would obtain if air flow were not obstructed throught the aperture 68'. As with the embodiment of FIGS. 1 and 2, the adsorptive material 76' may suitably be discarded at regular intervals after it has trapped a substantial quantity of the undesirable odor molecules driven off from the waste material.

With the structure of the preferred embodiment generally described above, the manner of operation of such apparatus may be as follows. With the foraminous panel 16 and the heating element positioned adjacent the lower portion of the container 2, conventional particulate litter material 20 is placed over the top of that panel 16. Preferably, a relatively thin layer of such particulate litter material 20, on the order of one-half inch in thickness, may be used with this invention.

After an animal has used the litter box, discharging its urine and feces upon the litter material 20, the heating apparatus may be activated. Preferably, but not necessarily, the feces should be removed from the litter and disposed. While the cover 56 is not critical to the sanitizing capability of this litter box, its presence serves to enhance the operation of the apparatus. This enhancement is effected both by the retention of potentially offensive odors and by retention of heat within the apparatus to effect faster drying and destruction of bacteria in the litter and feces. Activation of the apparatus provides for application of electrical current to the heating element 24 to heat the panel 16. Because the heating element 24 extends adjacent and substantially along each of the sides of the panel 16, energizing that heating element 24 serves to supply heat to substantially the entire litter material supporting portion of the panel 16. Heat from this element 24 is passed through the panel 16 to the litter material supported on the upwardly facing surface of the panel 16. This heat is passed both by conduction and by convection of air through the apertures 22 in that foraminous panel 16. Because the area of each of the apertures 22 through the panel is smaller than the average cross sectional area of the particles of the litter material, these apertures permit the passage of air while generally blocking any downward passage of litter material particles. The apertures 22 are illustrated in the drawings on a greatly enlarged scale for purposes of clarity of illustration.

The heating element 24 remains energized, under the control of the apparatus 28 with its thermostat control and, if desired, a timer, such that the temperature of the litter material 20 supported upon the panel 16 is raised to a predetermined level, suitably at least about 145 degrees F. This material is maintained at that level for a period of time, which, under appropriate conditions, may be as short as thirty minutes, sufficient to destroy bacteria residing upon the panel and upon the particulate litter material and also carried by the liquid and solid waste deposited thereupon. Preferably, this sanitizing procedure is carried out on a daily basis to control such bacteria and any viruses. During this heating the moisture from the urine and from the feces deposited by the animal is driven off. In the preferred embodiment most of the odor molecules carried by the moisture from the urine are adsorbed by the material 70 covering the aperture of the cover means and possibly also the adsorptive material 76 in the top of the cover 56. While the odor molecules are adsorbed, most of the moisture passes through the material 70 and 76 and evaporates. Where disposable material, such as newspaper or paper toweling, is used for this moisture and odor adsorbing function, it may be disposed of daily or as frequently as desired.

At the end of the sanitizing cycle the heating element 24 is deenergized, either manually or by action of a timer that may be included within the control apparatus 28. At this point the litter material has been substantially dried with most of the bacteria and viruses from the waste material having been killed by the heating process.

In a simpler and less preferred embodiment of the invention, the heating element could be omitted such that the litter box would comprise principally the container, the foraminous panel and, if desired, the tray. With this structure the apertures through the lower portions of the sides of the container would permit exterior air to enter the bottom of the litter box and pass upwardly through the tray if included and through the apertures in the foraminous panel to assist in drying the litter simply by circulation of air without heat. This circulation of air will improve the drying of the litter material and thus slow the growth of bacteria and viruses but will not serve to kill the bacteria and viruses as effectively as with use of the heating element described above.

While the foregoing describes a particularly preferred embodiment of the pet litter box of this invention, it is to be understood that this description is illustrative only of the principles of the invention and is not to be considered limitative thereof. Accordingly, because numerous variations and modifications of this apparatus, all within the scope of the invention, will readily occur to those skilled in the art, the scope of this invention is to be limited solely by the claims appended hereto.

What is claimed is:

1. A self-drying pet litter box for controlling odors by destroying bacteria comprising a box-like container having upwardly extended sides with at least one aperture through a lower portion of at least one of said sides, whereby air may pass through the aperture from points exterior to the container to the interior of the container, a foraminous panel received within said container and having at least one substantially flat surface, said panel extending substantially continuously between said container sides with the apertures through said panel being distributed across substantially the entire panel, and means for supporting said panel generally horizontally and spaced above the lowermost portion of said container sides with said substantially flat surface panel facing upwardly to support particulate litter material placed thereupon and another surface of said panel facing downward, whereby exterior air may enter the litter box through the apertures in the panel to dry the particulate litter material placed thereupon;

means for applying heat to said panel, whereby liquid and solid waste material deposited by an animal upon the particulate litter material supported by the panel may be heated;

means both for selectively controlling said application of heat to said panel such that the temperatures of said panel and of the litter material supported thereupon are raised to predetermined levels and maintained at those levels for a time sufficient to destroy bacteria and viruses residing upon said panel and upon the particulate litter material and carried by the liquid and solid waste deposited thereupon and also for thereafter discontinuing said application of heat.

2. The litter box of claim 1 wherein said panel includes edge portions engaging said container to substantially exclude particulate litter material placed into said container and upon said panel from passage between said panel edge portions and said container into the area beneath said panel.

3. The litter box of claim 1 wherein said panel is dimensioned and configured to cover substantially the entire area between said container sides at the level where said panel is supported, such that substantially all particulate litter material placed into said container and upon said panel will be supported upon or adjacent said panel.

4. The litter box of claim 1 wherein said heat controlling means comprises means for maintaining said temperature of said litter material at not less than about 145 degrees F.

5. The litter box of claim 1 wherein said heat applying means comprises resistive heating element means positioned adjacent the downward facing surface of said panel, whereby heat from the heating element means is passed through the panel to the litter supported thereupon.

6. The litter box of claim 5 wherein
said container is generally rectangular in plan with two sets of mutually opposing sides;
said panel is generally rectangular in plan with two sets of mutually opposing sides; and
said heating element means extends adjacent and substantially along each of said panel sides and between opposing said sides such that operation of said heating element means serves to apply heat to substantially the entire litter material supporting portion of said panel.

7. The litter box of claim 1 wherein said heat controlling means comprises thermostat means operatively connected to said panel for controlling said application of heat to said panel based upon the temperature of a portion of said panel.

8. The litter box of claim 7 wherein heat controlling means further comprises timer means for controlling the length of time that said heat is applied to said panel.

9. The litter box of claim 1 where the area of each of the apertures through said litter material supporting surface of said foraminous panel is smaller than the average cross sectional area of the particles of said litter material, whereby the apertures will permit the passage of air therethrough while generally blocking passage of litter material particles.

10. The litter box of claim 1 wherein said container includes tray means removably receivable within said container at a level below said foraminous panel, whereby the tray means, when so received, will catch material passing downwardly through the apertures of the foraminous panel.

11. The litter box of claim 10 wherein said tray means is dimensioned and configured to extend across substantially the entire area between said container sides at the level where said tray means is receivable.

12. The litter box of claim 11 wherein said tray means includes a base with sides extending upwardly therefrom and wherein said tray means sides include at least one aperture to permit the passage of air therethrough.

13. The litter box of claim 1 wherein said container further includes removable cover means extending across the top of said lateral sides.

14. The litter box of claim 13 wherein said cover means includes at least one aperture therethrough spaced from any of said container lateral sides.

15. The litter box of claim 14 wherein said cover means includes a generally flat panel member extending transversely of said container sides and proximal the uppermost edges thereof.

16. The litter box of claim 14 wherein said cover means includes side portions extending upwardly from the uppermost edges of said container sides with at least one said portion having an aperture therethrough dimensioned and positioned to permit passage of an animal therethrough, whereby an animal using the litter box may enter and exit through the aperture in the cover means.

17. The litter box of claim 16 wherein said cover means further comprises curtain means at least partially covering said cover means aperture.

18. The litter box of claim 17 wherein said curtain means is formed of a flexible odor adsorbing material, whereby at least a portion of any odor molecules driven off by heating of litter material within the litter box may be adsorbed by the curtain means to reduce the escape of odors.

19. The litter box of claim 18 wherein said curtain means comprises a plurality of elongated strips of said flexible material.

20. The litter box of claim 13 wherein said cover means includes means for supporting odor adsorbing material on a downward facing portion of said cover means.

* * * * *